Oct. 5, 1926.                                          1,601,795
R. C. GLOVER
MACHINE FOR STRAIGHTENING CLUTCH DISKS
Filed Sept. 29, 1924
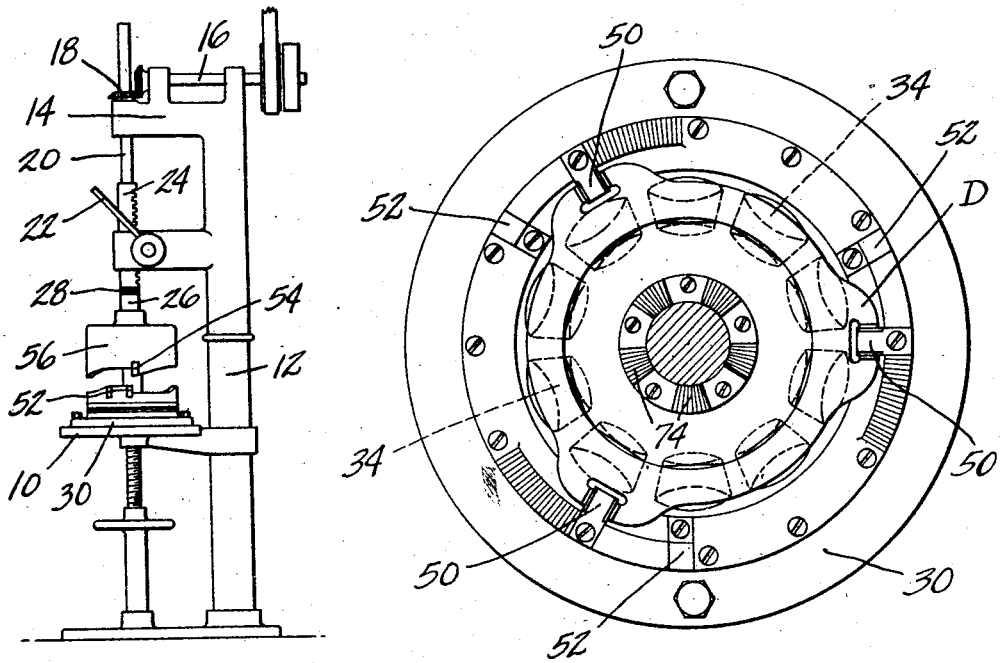
Fig. 1
Fig. 3
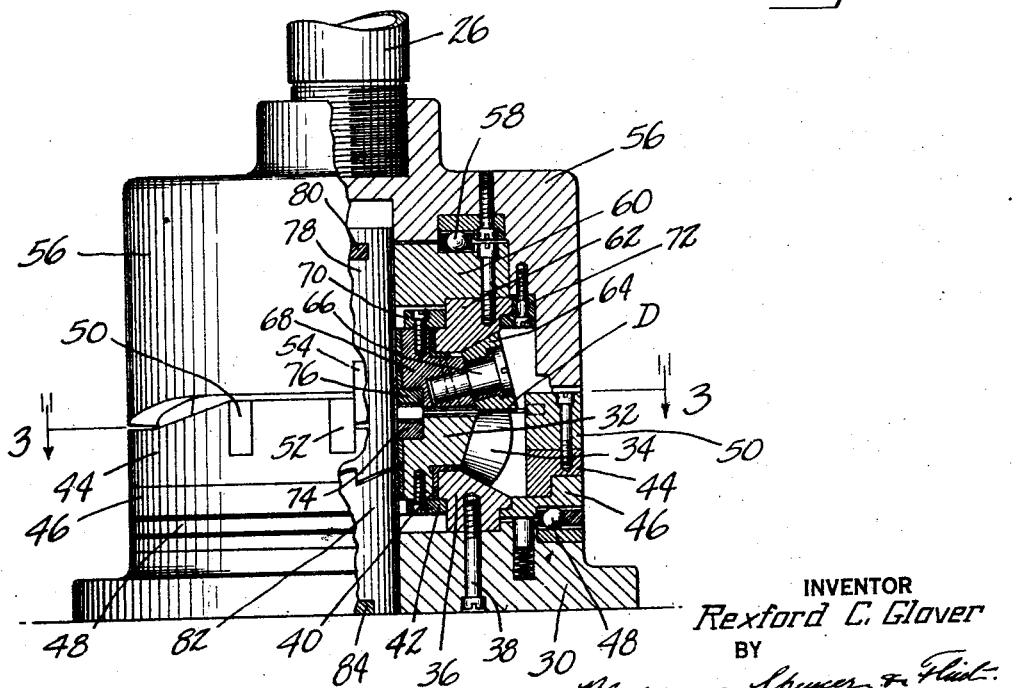
Fig. 2
INVENTOR
Rexford C. Glover
BY
ATTORNEYS Patented Oct. 5, 1926.

1,601,795

UNITED STATES PATENT OFFICE.

REXFORD C. GLOVER, OF FLINT, MICHIGAN, ASSIGNOR TO GENERAL MOTORS CORPORATION, OF DETROIT, MICHIGAN, A CORPORATION OF DELAWARE.

MACHINE FOR STRAIGHTENING CLUTCH DISKS.

Application filed September 29, 1924. Serial No. 740,514.

This invention relates to machines for straightening the driving disks of clutches, and is illustrated as embodied in a modification of a standard drill press having means for rotating the disks and means for straightening them while they are being rotated. An object of the invention is to provide a machine of this character arranged to drive the disks by engaging the usual driving notches in the outer edge of each disk. Other features of novelty relate to the arrangement of upper and lower sets of rollers which engage each disk, and flex it back and forth to straighten out any warped or distorted portions, and to other novel combinations of parts and desirable particular constructions which will be apparent from the following description of one illustrative embodiment shown in the accompanying drawings, in which:—

Figure 1 is a side elevation of the above-described modification of a drill press;

Fig. 2 is a view partly in vertical section and partly in side elevation, of the disk-straightening parts; and Fig. 3 is a horizontal section on the line 3—3 of Figure 2.

The machine shown in Fig. 1 includes an adjustable base or support 10, and a standard 12 having an arm 14 carrying a power-rotated shaft 16 driving, through bevel gears 18, a sleeve keyed to a vertical shaft 20. Shaft 20, and associated parts, may be raised and lowered by a lever 22 operating a pinion meshing with a rack on a sleeve 24 carrying the shaft. At its bottom, shaft 20 has secured thereto a sleeve 26, a thrust bearing 28 being interposed between the top of sleeve 26 and the bottom of sleeve 24.

Resting on the base 10 is a support 30 for a freely rotatable bed 32 carrying a series of conical rollers 34 rolling on a conical track 36 secured to support 30 by machine screws 38. A ring or bushing 40 of bearing material may be interposed between the track 36 and bed 32. Track 36 is shown formed with a horizontal flange projecting over a retainer plate 42 secured to the bed 32.

Surrounding the bed and rollers is a ring 44 having a part 46 resting on a thrust bearing 48, and formed with a positioning flange interlocking with a flange of track 36. Ring 44 is formed with three recesses, in which are secured three hardened blocks 50 shaped to fit within the driving notches in the outer edge of a driving disk "D" of a clutch.

Ring 44 also is provided with hardened blocks 52, forming clutch teeth engaged by similar clutch tooth blocks 54 in an upper cup-shaped driving member 56 secured to sleeve 26 and shaft 20. Thus when lever 22 is operated to lower shaft 20, the driving member 56 is brought into clutching engagement with ring 44, to rotate the clutch disk about its axis.

Inside member 56, and separated therefrom by a thrust bearing 58, is a support 60 for a conical track 62 for conical rollers 64 rotating on spindles 66 carried by a member 68. Member 68 is held against axial movement with respect to member 60 by a retainer plate 70 projecting over a flange formed on track 62. Track 62, and therefore support 60 and member 68, are held against axial movement with respect to the driving member 56 by a retainer plate 72 projecting over a flange on the track.

Bed 32 and member 68 are formed with interengaging clutch teeth 74 and 76, so spaced as to insure that the rollers 34 will be staggered with respect to rollers 64,—i. e. each roller 32 comes between two of the rollers 64. Thus dragging the clutch disk "D" between the two sets causes the rollers to roll on their tracks, and flexes every part of the disk back and forth, to straighten out any warped or distorted parts.

Support 60 and track 62 are held stationary, while each disk is straightened, by a clutch member 78 secured to support 60 by a cross key 80, and formed with clutch teeth engageable with teeth on a member 82 secured to support 30 by a cross key 84. Thus members 78 and 82 in effect form a spindle for bed 32 and member 68.

In the position of Fig. 1, parts 56, 62, 68, 78, and 64 are in an elevated position, permitting the operator to lay a disk "D" on the rollers 34, with its driving notches fitting over blocks 50. Lever 22 is then operated, to bring driving member 56 into clutching engagement with ring 44, to bring members 78 and 82 together, and to bring teeth 74 and 76 into clutching engagement. Now the tracks 36 and 62 are held stationary, while the clutch disk is rotated, dragging the upper and lower rollers around in rolling engagement with their tracks. The rolling and flexing of the disk effectively straightens any warped or distorted parts.

While one illustrative embodiment of the invention has been described in detail, it is not the intention to limit its scope to that particular embodiment, or otherwise than by the terms of the appended claims.

I claim:—

1. A machine for straightening the driving disks of clutches and which comprises, in combination, a rotatable ring having radial projections on its inner side to engage radial notches in the outer edge of a clutch disk, means to rotate the ring and a disk engaged thereby, and means engaging opposite sides of the rotating disk and operative to straighten it.

2. A machine for straightening the driving disks of clutches and which comprises, in combination, a rotatable ring having projections on its inner side to engage notches in the outer edge of a clutch disk, means to rotate the ring and a disk engaged thereby, and upper and lower sets of rollers within the periphery of the ring and engaging the upper and lower surfaces of the disk and which are bodily movable in rolling engagement with the disk to straighten it.

3. A machine as defined by claim 2, in which the rollers are conical, and in combination with conical tracks supporting the rollers.

4. A machine as defined by claim 2, in which the means for rotating the ring includes a cup-shaped clutch member operatively engaging the top of the ring and cooperating with the ring substantially to inclose the rollers and disk.

5. A machine comprising, in combination, a freely rotatable bed having rotatably mounted thereon a series of rollers, a ring surrounding the bed and rollers, means on the ring for driving a clutch plate resting on the rollers, a power-driven device engageable with the top of the ring for rotating it, and means engageable with the upper surface of the disk to cooperate with the rollers in straightening the disk.

6. A machine comprising, in combination, a freely rotatable bed having rotatably mounted thereon a series of rollers, a ring surrounding the bed and rollers, means on the ring for driving a clutch plate resting on the rollers, a power-driven device engageable with the top of the ring for rotating it, means engageable with the upper surface of the disk to cooperate with the rollers in straightening the disk, and a manually-operated member for separating said device and means from the rollers and ring to permit insertion and withdrawal of clutch disks.

7. A machine for straightening the driving disks of clutches and which comprises, in combination, a rotatable ring having projections on its inner side to engage notches in the outer edge of a clutch disk, means to rotate the ring and a disk engaged thereby, and means engaging opposite sides of the rotating disk and which are bodily movable in engagement with the disk by power derived from the disk.

In testimony whereof I affix my signature.

REXFORD C. GLOVER.